US012603850B2

(12) United States Patent
Nicas et al.

(10) Patent No.: US 12,603,850 B2
(45) Date of Patent: \*Apr. 14, 2026

(54) PREDICTIVE NETWORK CAPACITY SCALING BASED ON CUSTOMER INTEREST

(71) Applicant: AT&T Intellectual Property I, L.P., Atlanta, GA (US)

(72) Inventors: Nicholas Nicas, Blue Springs, MO (US); Todd Fryer, Liberty, MO (US); David Irvin, Lawrence, KS (US)

(73) Assignee: AT&T Intellectual Property I, L.P., Atlanta, GA (US)

( \* ) Notice: Subject to any disclaimer, the term of this patent is extended or adjusted under 35 U.S.C. 154(b) by 96 days.

This patent is subject to a terminal disclaimer.

(21) Appl. No.: 18/161,823

(22) Filed: Jan. 30, 2023

(65) Prior Publication Data

US 2023/0179542 A1      Jun. 8, 2023

Related U.S. Application Data

(63) Continuation of application No. 15/829,135, filed on Dec. 1, 2017, now Pat. No. 11,570,124.

(51) Int. Cl.
*H04L 47/83*         (2022.01)
*G06F 16/9535*     (2019.01)
         (Continued)

(52) U.S. Cl.
CPC .......... *H04L 47/83* (2022.05); *G06F 16/9535* (2019.01); *G06Q 30/0202* (2013.01);
         (Continued)

(58) Field of Classification Search
CPC .... G06Q 20/306; G06Q 20/32; G06Q 20/325; H04W 24/02; H04W 16/18; H04W 4/50;
         (Continued)

(56)         References Cited

U.S. PATENT DOCUMENTS 8,510,309 B2      8/2013  Priyadarshan et al.
8,640,032 B2      1/2014  Priyadarshan et al.
         (Continued)

OTHER PUBLICATIONS

M. Verhoeyen, D. De Vleeschauwer and D. Robinson, "Content storage architectures for boosted IPTV service," in Bell Labs Technical Journal, vol. 13, No. 3, pp. 29-43, Fall 2008 (Year: 2008).*

*Primary Examiner* — Rutao Wu
*Assistant Examiner* — Sarjit S Bains

(57)         ABSTRACT

In one example, the present disclosure describes a device, computer-readable medium, and method for scaling network capacity predictively, based on customer interest. For instance, in one example, a method includes predicting an interest of a first customer in data content that will be available for consumption over a data network at a time in the future, wherein the predicting is based on customer data including at least a search pattern associated with the first customer, flagging the data content when the predicting indicates at least a threshold degree of likelihood that the first customer will be interested in the data content, and scaling an allocation of resources of the data network to the first customer, based on the flagging.

20 Claims, 3 Drawing Sheets

200

START — 202

OBTAIN CUSTOMER DATA INCLUDING CUSTOMER SEARCH PATTERNS — 204

PREDICT CUSTOMER'S FUTURE INTEREST IN HIGH-BANDWIDTH CONTENT BY CORRELATING CUSTOMER DATA WITH INFORMATION ABOUT HIGH-BANDWIDTH CONTENT THAT WILL BE AVAILABLE IN THE FUTURE — 206

FLAG HIGH-BANDWIDTH CONTENT IN WHICH THE CUSTOMER IS CONSIDERED LIKELY TO BE INTERESTED — 208

SCALE NETWORK RESOURCES AVAILABLE TO CUSTOMER BASED ON FLAGS — 210

(51) Int. Cl.

| | |
|---|---|
| *G06Q 30/0202* | (2023.01) |
| *H04H 20/00* | (2009.01) |
| *H04H 20/42* | (2008.01) |
| *H04W 4/50* | (2018.01) |
| *H04W 74/00* | (2009.01) |

(52) U.S. Cl.
CPC ............ *H04H 20/00* (2013.01); *H04H 20/42* (2013.01); *H04W 4/50* (2018.02); *H04W 74/00* (2013.01)

(58) Field of Classification Search
CPC .. H04W 72/04; H04L 67/568; H04L 67/5681; H04L 67/563; H04L 67/535; H04L 49/00; H04L 67/306; H04L 65/611; H04L 65/612; H04L 41/0896; H04L 67/61; H04L 67/55; H04L 67/52
See application file for complete search history.

(56) References Cited

U.S. PATENT DOCUMENTS

| | | | |
|---|---|---|---|
| 9,183,247 B2 | 11/2015 | Priyadarshan et al. | |
| 9,426,242 B2 | 8/2016 | Pitschel et al. | |
| 9,781,607 B2 | 10/2017 | Rath et al. | |
| 2002/0198991 A1 | 12/2002 | Gopalakrishnan et al. | |
| 2003/0002862 A1 | 1/2003 | Rodriguez et al. | |
| 2009/0083141 A1 | 3/2009 | Craine | |
| 2009/0199230 A1 | 8/2009 | Kumar et al. | |
| 2009/0199234 A1 | 8/2009 | Mukerji et al. | |
| 2010/0179987 A1* | 7/2010 | Sebastian | H04L 47/70 709/224 |
| 2010/0251286 A1 | 9/2010 | Ahn et al. | |
| 2011/0118858 A1* | 5/2011 | Rottler | H04N 21/2747 711/E12.001 |
| 2011/0282964 A1 | 11/2011 | Krishnaswamy et al. | |
| 2013/0132854 A1 | 5/2013 | Raleigh et al. | |
| 2013/0142040 A1* | 6/2013 | Fryer | H04L 47/805 370/230 |
| 2013/0311669 A1* | 11/2013 | Reimers | H04H 60/06 709/231 |
| 2014/0018033 A1 | 1/2014 | Luna | |
| 2014/0019443 A1 | 1/2014 | Golshan | |
| 2014/0280679 A1 | 9/2014 | Dey et al. | |
| 2015/0070585 A1* | 3/2015 | Sharif-Ahmadi | H04N 21/47 455/434 |
| 2015/0142910 A1 | 5/2015 | Harrang et al. | |
| 2015/0245108 A1* | 8/2015 | Pfeffer | H04N 21/24 725/96 |
| 2016/0173925 A1 | 6/2016 | Gordon et al. | |
| 2016/0191664 A1* | 6/2016 | Balakrishnan | H04L 67/1097 709/203 |
| 2016/0294956 A1* | 10/2016 | Fix | H04L 65/612 |
| 2017/0140285 A1* | 5/2017 | Dotan-Cohen | G06F 3/01 |
| 2017/0220926 A1 | 8/2017 | Chhabra et al. | |
| 2018/0084306 A1* | 3/2018 | Hunter | H04H 60/66 |

* cited by examiner

300

PREDICTIVE NETWORK CAPACITY SCALING BASED ON CUSTOMER INTEREST

This application is a continuation of U.S. patent application Ser. No. 15/829,135, filed on Dec. 1, 2017, now U.S. Pat. No. 11,570,124, which is herein incorporated by reference in its entirety.

The present disclosure relates generally to digital data distribution, and relates more particularly to devices, non-transitory computer-readable media, and methods for predicting future customer usage of high bandwidth services over a data network based on customer interest.

BACKGROUND

Customer traffic on data networks can vary. For example, certain events may cause spikes in the usage of high bandwidth services (e.g., multimedia, video, etc.). If the data network is not provisioned to support these spikes, customer experience may suffer.

SUMMARY

In one example, the present disclosure describes a device, computer-readable medium, and method for scaling network capacity predictively, based on customer interest. For instance, in one example, a method includes predicting an interest of a first customer in data content that will be available for consumption over a data network at a time in the future, wherein the predicting is based on customer data including at least a search pattern associated with the first customer, flagging the data content when the predicting indicates at least a threshold degree of likelihood that the first customer will be interested in the data content, and scaling an allocation of resources of the data network to the first customer, based on the flagging.

In another example, a device includes a processor and a computer-readable medium storing instructions which, when executed by the processor, cause the processor to perform operations. The operations include predicting an interest of a first customer in data content that will be available for consumption over a data network at a time in the future, wherein the predicting is based on customer data including at least a search pattern associated with the first customer, flagging the data content when the predicting indicates at least a threshold degree of likelihood that the first customer will be interested in the data content, and scaling an allocation of resources of the data network to the first customer, based on the flagging.

In another example, a computer-readable medium stores instructions which, when executed by the processor, cause the processor to perform operations. The operations include predicting an interest of a first customer in data content that will be available for consumption over a data network at a time in the future, wherein the predicting is based on customer data including at least a search pattern associated with the first customer, flagging the data content when the predicting indicates at least a threshold degree of likelihood that the first customer will be interested in the data content, and scaling an allocation of resources of the data network to the first customer, based on the flagging.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for scaling data network capacity predictively, based on customer interest. As discussed above, certain events may cause spikes in the usage of high bandwidth services (e.g., multimedia, video, etc.). For instance, events that generate an exceptionally high level of customer interest, such as professional sports championship broadcasts and premieres of popular television shows may increase the demand on a data network. Many solutions have been proposed to accommodate such increased demand, but at the expense of the customer experience. For instance, compression techniques can be used to reduce video bandwidth, but often result in degradation of the native content (e.g., lower resolution video).

Examples of the present disclosure utilize customer data patterns to predict future customer usage of high bandwidth (e.g., multimedia, video, etc.) services over a data network. The data patterns may include, for instance, customer search and data consumption patterns, as well as demographic and/or geographic patterns. This allows the data network provider to identify when and where (e.g., specific geographic regions, specific windows of time, etc.) the data network may experience an unforeseen spike in network traffic. The data network provider may then provision the data network so that the spike can be accommodated without affecting the customer experience. For instance, the data network provider may perform unscheduled scaling of bandwidth allocations by re-routing network traffic, adding bandwidth, and/or taking other measures in anticipation of the spike.

Within the context of the present disclosure, an "unscheduled" scaling of data network resources refers to a scaling that is performed in response to a data event (e.g., a live broadcast or premiere of high-bandwidth data content) for which a large-scale scaling of resources has not already been planned. For instance, a data network provider may plan an increase in network bandwidth to coincide with a live broadcast event that is expected to generate a spike in interest among the customer base at large (e.g., the Super Bowl). By contrast, an unscheduled, localized increase in network bandwidth may be implemented in response to a predicted level of interest of one or a few customers.

Figure 1:
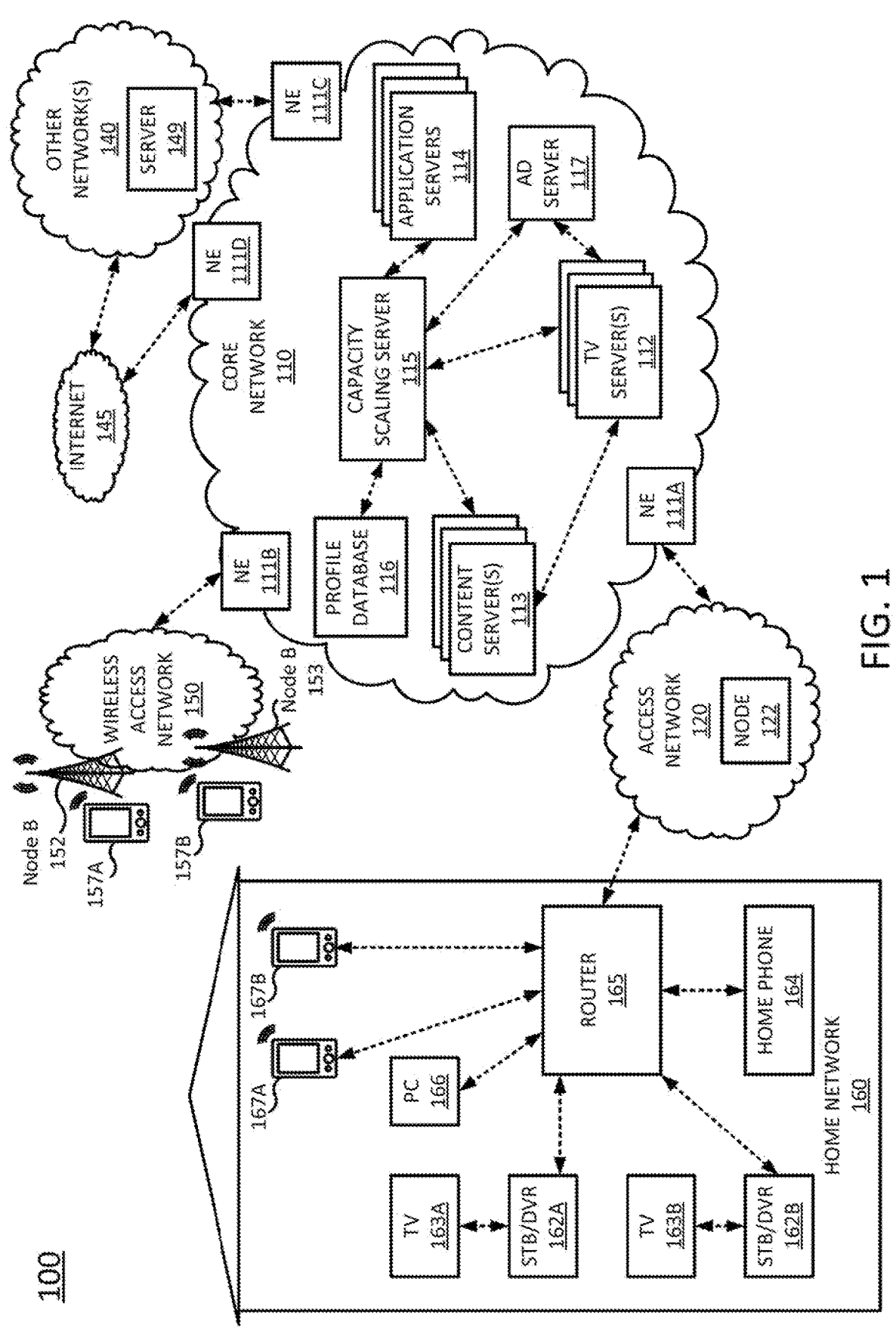
FIG. 1 illustrates an example content distribution network related to the present disclosure.

To better understand the present disclosure, FIG. 1 illustrates an example network 100, related to the present disclosure. As shown in FIG. 1, the network 100 may comprise a content distribution network (e.g., data network) that connects mobile devices 157A, 157B, 167A and 167B, and devices such as set-top boxes (STBs) 162A, and 162B, television (TV) 163A and TV 163B, router 165, personal computer (PC) 166, and so forth, with one another and with various other devices via a core network 110, a wireless access network 150 (e.g., a cellular network), an access network 120, other networks 140 and/or the Internet 145.

Mobile devices 157A, 157B, 167A and 167B, and devices such as set-top boxes (STBs) 162A, and 162B, television (TV) 163A and TV 163B, router 165, and personal computer (PC) 166 may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a portable gaming device, a wearable smart device (e.g., a smart watch or a fitness tracker), a satellite radio receiver or satellite television receiver, or any other device having a user interface that is capable of receiving bandwidth from the network 100 in the form of streaming data. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a digital content distribution application that allows the user of the mobile device to access digital multimedia content such as videos, images, audio, web sites, and the like.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a capacity scaling server 115, and a profile database 116. For ease of illustration, various additional elements of core network 110 are omitted from FIG. 1.

With respect to television service provider functions, core network 110 may include one or more third party television content (TV) servers 112 for the delivery of television content. In this regard, television servers 112 may interact with content servers 113 and advertising server 117 to select which video programs, or other content and advertisements to provide to the home network 160, to the mobile devices 157A, 157B, 167A, and 167B, and to other downstream viewing locations.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

The capacity scaling server 115 performs operations, discussed in greater detail below in connection with FIG. 2, related to predicting future usage of a data network's high bandwidth services and to scaling resources of the data network to accommodate anticipated spikes in traffic. In one example, the capacity scaling server 115 comprises a software defined networking (SDN) system. The capacity scaling server may perform these operations in connection with data stored in the profile database 116.

The profile database 116 may store profiles for customers of the network 100. The profiles may include, for each customer, one or more of the following types of data: customer identity (e.g., a name or another unique identifier, such as a customer number), customer geographic patterns (e.g., locations from which the customer is observed to use the network 100), customer search patterns (e.g., keywords, results, and other data relating to searches the customer has performed for content using the network 100), devices used by the customer to connect to the network 100 and/or to consume content (e.g., mobile devices, set top boxes, Internet-enabled televisions, etc.), methods by which content is delivered to the customer's devices (e.g., over the top (OTT), live, video on demand (VOD), fixed bitrate, etc.), customer content consumption history (e.g., genres and/or instances of content consumed) and/or customer content consumption patterns (e.g., rate of content consumption, resolution of content consumed, times of day at which content is consumed). Customer profiles may be stored in encrypted form to protect customer privacy. In one example, the profile database 116 may be part of an enterprise data warehouse (EDW) or other type of data warehouse (DW).

Figure 3:
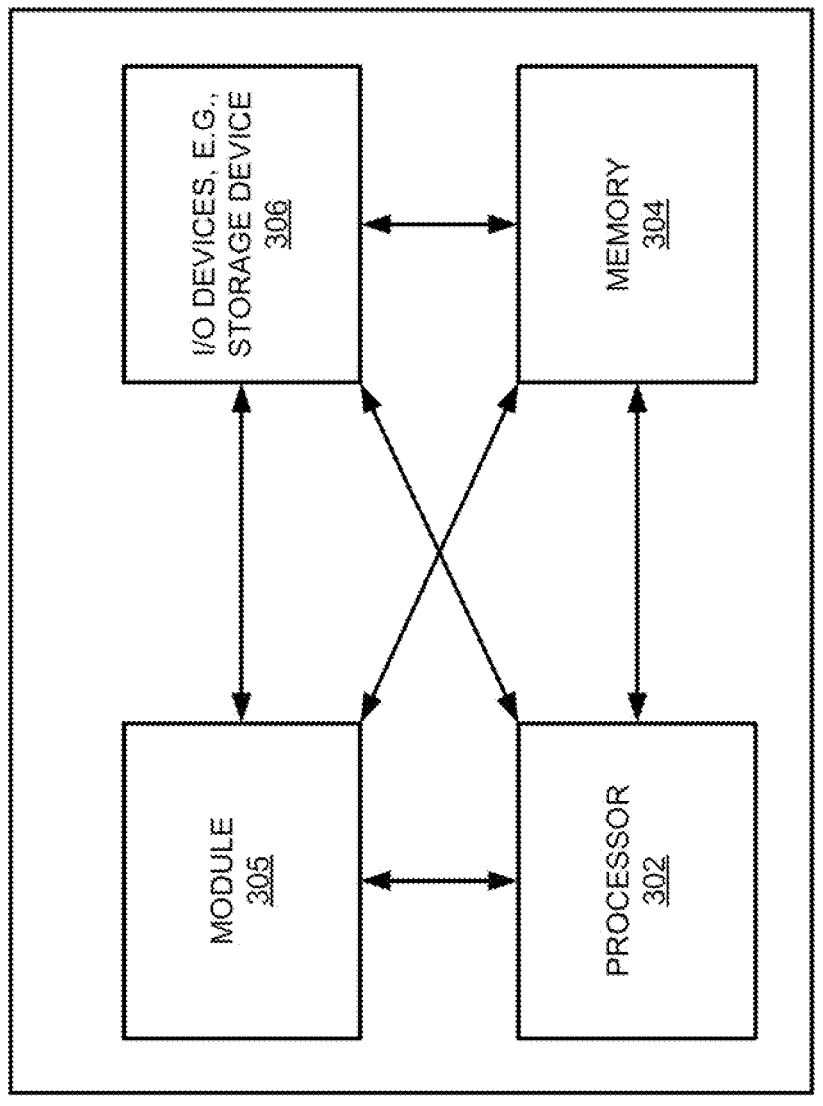
FIG. 3 depicts a high-level block diagram of a computing device specifically programmed to perform the functions described herein.

In one example, any or all of the television servers 112, content servers 113, application servers 114, capacity scaling server 115, and advertising server 117 may comprise a computing system, such as computing system 300 depicted in FIG. 3.

In one example, the access network 120 may comprise a Digital Subscriber Line (DSL) network, a Local Area Network (LAN), a cellular or wireless access network, a 3rd party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to communications with web servers via the Internet 145 and/or other networks 140, and so forth.

In one example, home network 160 may include a router 165, which receives data/communications associated with different types of media, e.g., television, phone, and Internet, and separates these communications for the appropriate devices. The data/communications may be received via access network 120, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
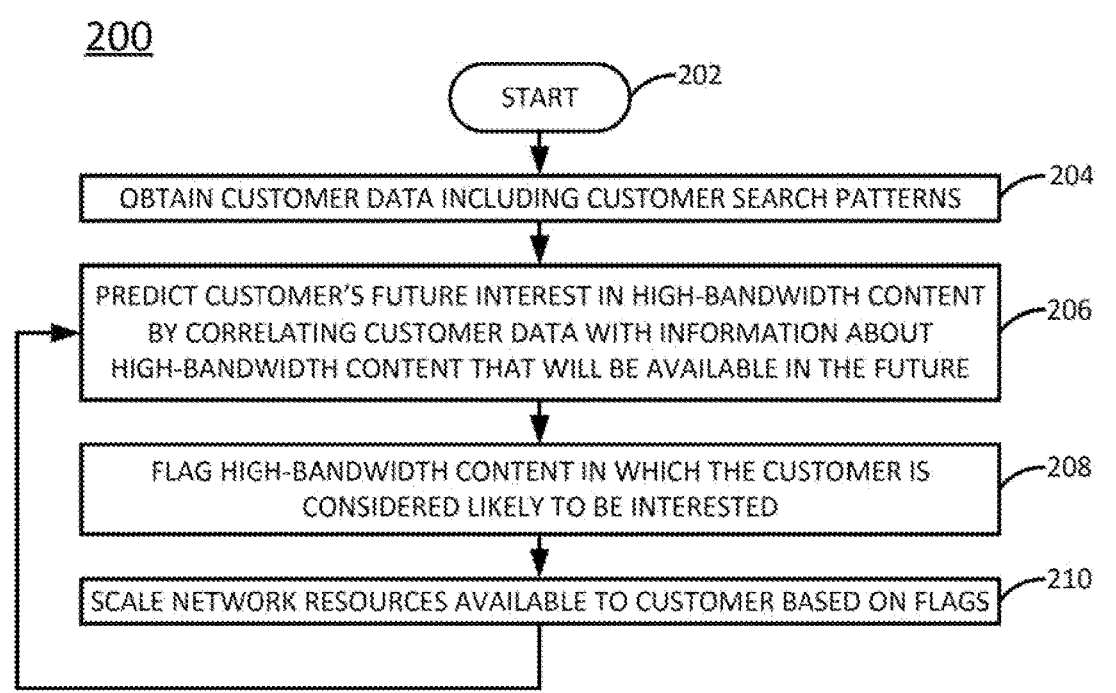
FIG. 2 illustrates a flowchart of an example method for scaling data network capacity in response to predicted future usage.

To further aid in understanding the present disclosure, FIG. 2 illustrates a flowchart of an example method 200 for scaling data network capacity in response to predicted future usage. In one example, the method 200 may be performed by the capacity scaling server 115 and/or additional devices illustrated in FIG. 1. However, in other examples, the method 200 may be performed by another device or devices (e.g., one or more application servers 114 or other device(s)). As such, any references in the discussion of the method 200 to components of FIG. 1 are not intended to limit the means by which the method 200 may be performed.

The method 200 begins in step 202. In step 204, customer data pertaining to a particular customer is obtained, including at least the customer's network search patterns. Customer search patterns may include information (e.g., search keywords, search results, tags, etc.) relating to content for which the customer has searched the data network. For instance, the customer may have used a search engine to search the data network for information on a specific football team's schedule, or when a streaming video service is scheduled to release a new season of a television show. These searches create a trail that indicates the customer's interests with respect to the content he or she consumes (and is likely to consume in the future) over the data network. In one example, the customer opts in to have his or her search patterns made available for analysis. In this case, the search pattern data contained in the customer data may be more detailed (e.g., actual search keywords, search results, hyperlinks clicked in conjunction with searches, etc.). However, if the customer opts not to have his or her search patterns made available for analysis, then the search pattern data may comprise less detailed data, such as general metadata (e.g., tags).

The customer data may also include customer geographic patterns (e.g., locations from which the customer is observed to consume high-bandwidth content over the network), devices used by the customer to connect to the network 100 and/or to consume high-bandwidth content (e.g., mobile devices, set top boxes, Internet-enabled televisions, etc.), methods by which high-bandwidth content is delivered to the customer's devices (e.g., OTT, live, VOD, fixed bitrate, etc.), customer high-bandwidth content consumption history (e.g., genres and/or instances of high-bandwidth content consumed, such as "sports," "drama," or specific television series or live broadcast events) and/or customer high-bandwidth content consumption patterns (e.g., rate of content consumption, resolution of content consumed, times of day at which content is consumed, etc.). The customer data may be obtained from a customer profile, such as a customer profile stored in a database (e.g., profile database 116 of FIG. 1). The customer profile may identify the customer by name, or may be anonymized in some way (e.g., by using a numerical identifier instead of a name).

In step 206, the customer's future interest in high-bandwidth content is predicted by correlating the customer data obtained in step 204 with information about high-bandwidth content that will be available over the data network in the future. For instance, a high likelihood of interest may be predicted when the customer's search patterns include a search for a particular television series, and a streaming video service is scheduled to release new episodes for the television series on a future date. Conversely, a low likelihood of interest may be predicted when the customer's search patterns do not include a search for the particular television series, and the customer's consumption history shows no evidence of the customer having ever viewed the television series. In further examples, the customer's level of interest in the high-bandwidth content may be based at least in part on the level of interest of other, similar customers (e.g., other customers whose search patterns meet some threshold of similarity to the customer's search patterns, other customers who reside within a defined geographic radius of the customer, other customers whose historical consumption patterns meet some threshold of similarity to the customer's historical consumption patterns, etc.).

In one example, the customer's level of future interest is quantified in some measurable way (e.g., x % likely to be interested). This quantified level of interest may be computed from some combination of: (1) the number or percentage of searches performed by the customer that are related to the high-bandwidth content (e.g., specifically name the title, actors, directors, or the like appearing in the high-bandwidth content, identify the same genre as the high-bandwidth content, identify the source of the high-bandwidth content, etc.); and (2) the number of keywords relating to the high-bandwidth content that appear in search results produced in response to the customer's searches. The combination may comprise, for example, a weighted sum, where the number or percentage of searches is multiplied by a first weight, and then added to the number of keywords multiplied by a second weight. In one example, the correlation is identified by utilizing a data processing engine such as the HADOOP software framework or SPARK processing engine.

In step 208, any high-bandwidth content that the customer is considered likely to be interested in in the future (e.g., as determined in step 206) is flagged in some manner. For instance, a flag (or other indicator) may be set in the customer's profile to indicate that the customer is likely to be interested in (e.g., the level of interest quantified in step 206 is above a predefined threshold) the high-bandwidth content. The flag may be linked to or point to information about the high-bandwidth content (e.g., the date and/or time at which the content will be available, the source of the content, the expected file size of the content, etc.). Alternatively, the flag could be tracked by an SDN system (e.g., scaling server 115 of FIG. 1) that performs scaling of network resources to customers.

In step 210, the network resources available to at least one user endpoint device associated with the customer are scaled at least temporarily, based on the flags in the customer's profile. In one example, scaling of resources in accordance with step 210 is based on a weighted system of streaming data, where the weighted system includes a range of weights or values, and each weight is associated with a specific level of quality of data and a specific set of resources allocated thereto. For instance, a lowest (or lowest priority) value on the scale may be associated with stored, low-bandwidth streaming data (e.g., audio only data), whereas a highest (or highest priority) value on the scale may be associated with live high-definition fixed bitrate video data (e.g., a live sporting event broadcast). As discussed above, scaling the resources may involve temporarily (e.g., for the duration of time it takes the customer to consume data content, or for the duration of time that the data content is available) rerouting network traffic, temporarily adding bandwidth, or other scaling techniques.

The method 200 then returns to step 206 and continues as described above to predict the customer's future interest in high-bandwidth content and to responsively scale the resources made available to the customer's user endpoint device(s).

Thus, the method 200 is able to predict a customer's future interest in high-bandwidth data content and to scale the data network resources made available to the customer in an unscheduled manner that provides an optimized customer experience when the customer actually consumes the high-bandwidth data content. This approach preserves the integrity of the native content, as it does not require the native content to be compressed. The method 200 can also provide relief for other payloads in the data network during periods of high demand.

In some cases, a prediction may indicate that a customer is highly likely to watch data content that is scheduled as a live broadcast (e.g., a new episode of a popular television show). However, the data content may be available as a prerecorded program in available authorized network storage (e.g., TV servers 112 of FIG. 1). In this case, the system and method of the present disclosure may notify the customer of the pre-release of the data content in advance of the live broadcast, thereby allowing the customer to consume the data content during a time when there is less demand on the data network. The system and method of the present disclosure could also include partial caching of pre-recorded "live" broadcast content, followed by live streaming of a remainder of the content at a time of consumption, in order to minimize the need for buffering on the customer side and, ultimately, shift the demand on the data network.

Moreover, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server or SDN system (such as might be used to perform the method 200) could be implemented as illustrated in FIG. 3.

As depicted in FIG. 3, the system 300 comprises a hardware processor element 302, a memory 304, a module 305 for scaling data network capacity predictively, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for scaling data network capacity predictively may include circuitry and/or logic for performing special purpose functions relating to analyzing customer data, predicting customer interest in high-bandwidth data content based on the customer data, and/or scaling data network resources in response to the customer interest. The input/output devices 306 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for scaling data network capacity predictively (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for scaling data network capacity predictively (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:

predicting, by a processor of a data network, an interest of a first customer in a video program that is scheduled to be available for consumption over the data network at a scheduled broadcast time in the future, wherein the predicting is based on customer data including at least a search pattern associated with the first customer;

flagging, by the processor, the video program when the predicting indicates at least a threshold degree of likelihood that the first customer will be interested in the video program; and scaling, by the processor, an allocation of resources of the data network to the first customer, wherein the scaling is unscheduled and is based on the flagging, wherein the scaling comprises:

transmitting, to an endpoint device of the first customer, a first portion of the video program from a storage of the data network in advance of the scheduled broadcast time for caching by the endpoint device until the scheduled broadcast time, wherein the first portion of the video program is less than all of the video program, and wherein a second portion of the video program is not transmitted to the endpoint device of the first customer prior to the scheduled broadcast time;

adding a bandwidth to a localized portion of the data network in response to the flagging, wherein the bandwidth is further added in response to a prediction of an interest of a plurality of customers in the video program, wherein each of the plurality of customers is associated with the localized portion of the data network, and wherein the plurality of customers includes the first customer; and streaming, to the endpoint device of the first customer in accordance with the bandwidth that is added, the second portion of the video program from a live broadcast during the scheduled broadcast time, wherein the video program is a single program.

2. The method of claim 1, wherein the search pattern comprises a tag associated with a search of the data network for content, the search being performed by the first customer.

3. The method of claim 1, wherein the search pattern comprises a search keyword associated with a search of the data network for content, the search being performed by the first customer.

4. The method of claim 1, wherein the search pattern comprises a search result associated with a search of the data network for content, the search being performed by the first customer.

5. The method of claim 1, wherein the search pattern comprises a hyperlink clicked by the first customer in conjunction with a search of the data network for content.

6. The method of claim 1, wherein the customer data additionally includes a geographic pattern of the first customer relating to consumption of video programs over the data network.

7. The method of claim 1, wherein the customer data additionally includes information pertaining to the endpoint device used by the first customer to receive video programs from the data network.

8. The method of claim 1, wherein the customer data additionally includes a method by which the data network delivers video programs to the first customer.

9. The method of claim 1, wherein the customer data additionally includes a historical pattern of video program consumption associated with the first customer.

10. The method of claim 1, wherein the customer data is stored in a profile for the first customer.

11. The method of claim 10, wherein the profile anonymizes an identity of the first customer.

12. The method of claim 10, wherein the flagging comprises setting a flag in the profile to indicate the interest.

13. The method of claim 1, wherein the predicting is further based on an interest of a second customer in the video program, and wherein the second customer shares a similarity with the first customer.

14. The method of claim 1, wherein the scaling further comprises rerouting network traffic in the data network.

15. The method of claim 1, wherein the scaling is based on a weighted system that associates different weights with different levels of data quality and different allocations of the resources.

16. A device comprising:
a processor; and
a computer-readable medium storing instructions which, when executed by the processor when deployed in a data network, cause the processor to perform operations, the operations comprising:
   predicting an interest of a first customer in a video program that is scheduled to be available for consumption over the data network at a scheduled broadcast time in the future, wherein the predicting is based on customer data including at least a search pattern associated with the first customer;
   flagging the video program when the predicting indicates at least a threshold degree of likelihood that the first customer will be interested in the video program; and
   scaling an allocation of resources of the data network to the first customer, wherein the scaling is unscheduled and is based on the flagging, wherein the scaling comprises:
      transmitting, to an endpoint device of the first customer, a first portion of the video program from a storage of the data network in advance of the scheduled broadcast time for caching by the endpoint device until the scheduled broadcast time, wherein the first portion of the video program is less than all of the video program, and wherein a second portion of the video program is not transmitted to the endpoint device of the first customer prior to the scheduled broadcast time;
      adding a bandwidth to a localized portion of the data network in response to the flagging, wherein the bandwidth is further added in response to a prediction of an interest of a plurality of customers in the video program, wherein each of the plurality of customers is associated with the localized portion of the data network, and wherein the plurality of customers includes the first customer; and
      streaming, to the endpoint device of the first customer in accordance with the bandwidth that is added, the second portion of the video program from a live broadcast during the scheduled broadcast time, wherein the video program is a single program.

17. A non-transitory computer-readable medium storing instructions which, when executed by a processor when deployed in a data network, cause the processor to perform operations, the operations comprising:
   predicting an interest of a first customer in a video program that is scheduled to be available for consumption over the data network at a scheduled broadcast time in the future, wherein the predicting is based on customer data including at least a search pattern associated with the first customer;
   flagging the video program when the predicting indicates at least a threshold degree of likelihood that the first customer will be interested in the video program; and
   scaling an allocation of resources of the data network to the first customer, wherein the scaling is unscheduled and is based on the flagging, wherein the scaling comprises:
      transmitting, to an endpoint device of the first customer, a first portion of the video program from a storage of the data network in advance of the scheduled broadcast time for caching by the endpoint device until the scheduled broadcast time, wherein the first portion of the video program is less than all of the video program, and wherein a second portion of the video program is not transmitted to the endpoint device of the first customer prior to the scheduled broadcast time;
      adding a bandwidth to a localized portion of the data network in response to the flagging, wherein the bandwidth is further added in response to a prediction of an interest of a plurality of customers in the video program, wherein each of the plurality of customers is associated with the localized portion of the data network, and wherein the plurality of customers includes the first customer; and
      streaming, to the endpoint device of the first customer in accordance with the bandwidth that is added, the second portion of the video program from a live broadcast during the scheduled broadcast time, wherein the video program is a single program.

18. The non-transitory computer-readable medium of claim 17, wherein the scaling further comprises rerouting network traffic in the data network.

19. The non-transitory computer-readable medium of claim 17, wherein the search pattern comprises a tag associated with a search of the data network for content, the search being performed by the first customer.

20. The non-transitory computer-readable medium of claim 17, wherein the search pattern comprises a search keyword associated with a search of the data network for content, the search being performed by the first customer.

* * * * *